United States Patent [19]

Richter

[11] Patent Number: 4,740,126

[45] Date of Patent: Apr. 26, 1988

[54] GRIPPING HAND FOR A MANIPULATOR

[75] Inventor: Hans Richter, Augsburg, Fed. Rep. of Germany

[73] Assignee: Blomberg Robotertechnik GmbH, Ahlen, Fed. Rep. of Germany

[21] Appl. No.: 887,042

[22] PCT Filed: Nov. 22, 1985

[86] PCT No.: PCT/EP85/00637

§ 371 Date: Jul. 21, 1986

§ 102(e) Date: Jul. 21, 1986

[87] PCT Pub. No.: WO86/03156

PCT Pub. Date: Jun. 5, 1986

[30] Foreign Application Priority Data

Nov. 23, 1984 [DE] Fed. Rep. of Germany ....... 8434357

[51] Int. Cl.⁴ .................................................. B25J 1/00
[52] U.S. Cl. ........................................... 414/4; 414/1; 901/4; 623/64
[58] Field of Search ................. 901/1, 3, 4, 50; 414/1, 414/4, 5, 6; 128/26, 77; 623/63, 64

[56] References Cited

U.S. PATENT DOCUMENTS

| Re. 31,581 | 5/1984 | Richter | 414/730 |
| 3,203,824 | 8/1966 | Jones et al. | 414/5 |
| 4,302,138 | 11/1981 | Zarudiansky | 414/5 |
| 4,575,297 | 3/1986 | Richter | 901/3 X |
| 4,589,810 | 5/1986 | Heindl et al. | 901/4 X |

FOREIGN PATENT DOCUMENTS

| 365503 | 1/1982 | Austria . |
| 3211992 | 10/1983 | Fed. Rep. of Germany . |
| WO83/02249 | 7/1983 | World Int. Prop. O. . |
| 785842 | 12/1980 | U.S.S.R. . |

OTHER PUBLICATIONS

"Binks Robot: A Universal Spraying Machine", Binks Manufacturing Company Bulletin A97-5R-2, 10-1983, pp. 1-7.

Primary Examiner—Robert J. Spar
Assistant Examiner—Jennifer Doyle
Attorney, Agent, or Firm—Fleit, Jacobson, Cohn & Price

[57] ABSTRACT

A gripping hand for a manipulator which consists of several hollow elements, simulating the human hand, which are linked to one another by articulations, whereby each member has a corresponding, reversibly actuated positioning drive and a sensor. For programming, the sensors detect the movements of the elements which are derived from a human hand inserted in the gripping hand, and the signals from the sensors determine the program which the elements perform, controlled by the relevant positioning drive. The gripping hand is associated with an arm which can be programmed by the movements of the gripping hand, if a human hand describing these movements is inserted in the gripping hand, and this arm can perform movements in three mutually perpendicular axes and rotary movements.

13 Claims, 1 Drawing Sheet

GRIPPING HAND FOR A MANIPULATOR

BACKGROUND OF THE INVENTION

The invention relates to a gripping hand for a manipulator, which comprises a plurality of hollow members simulating the human hand, which are interconnected in an articulated manner, a reversibly actuated positioning drive and a sensor being associated with each member, for programming purposes the sensors detect the movements of the members derived from a human hand inserted in the gripping hand and the signals of the sensors determine the program performed by the members, controlled by the particular positioning drive, the gripping hand being arranged on an arm, which is programmable by the movements of the gripping hand, if a human hand performing these movements is inserted in the gripping hand and this arm is able to perform movements in three axes which are perpendicular to one another and also rotary movements.

Such a gripping hand is represented in WO No. 83/02249. It forms part of a manipulator, comprising several arm members simulating the human arm, which are articulated to a breastplate, which is carried by a chassis. The chassis is positioned in linkages, whose end remote from the chassis is placed on a rigid support. In the roller chain between the rigid support and the gripping hand a positioning drive and at least one sensor is associated with each chain link. For programming the manipulator and the gripping hand, a person positions himself on the chassis and performs the movements to be programmed. These movements are detected by the sensors associated with the members of the gripping hand and the sensors associated with the chain links and the signals produced by the sensors are recorded and then determine the movements to be performed by the manipulator and the gripping hand, in each case controlled via the positioning drives.

The manipulator is specially constructed.

A number of further manipulators are known, which are constructed according to the principle of a four or five joint unit. Such a manipulator is, e.g., shown in Austrian Pat. No. 365 503. It is known to equip such manipulators with a programming grip, so as to be able to program the manipulator movements. The programming grip is arranged on the final member of the manipulator. During programming, the programming grip is grasped and the sensors associated therewith produce signals, which are recorded and which simultaneously control the manipulator positioning drives, so that the final manipulator member on which the programming grip is arranged can follow a desired movement path. The aforementioned Austrian Pat. No. 365 503 shows two embodiments of such a programming grip.

The problem is to connect the aforementioned gripping hand to a random manipulator in such a way that at the same time as the programming of the movements of the members of the gripping hand, the manipulator can be programmed and its part to which is fixed the gripping hand performs movements which have to be carried out by the gripping hand.

SUMMARY OF THE INVENTION

The following explanation is given of the solution for the problem.

With each of the members of the gripping hand is associated a sensor, which detects the movements of the member associated therewith when this is moved by the hand. The recordings of the signals of the sensor then control the positioning drive associated with said member.

A manipulator, whose members are not manually movable and whose movements during programming are brought about by a programming grip by the positioning drives thereof, takes place in a different way. The sensors arranged in the programming grip detect the movements initiated by the hand and convert them into electric signals. These electric signals undergo coordinate transformation and lead to control signals for the individual positioning drives of the manipulator. If, for example, a vertical movement is to be performed, then the sensor associated with said vertical movement produces a signal which, after transformation, leads to control signals controlling more than one positioning drive, in whose cooperation the vertical movement is brought about.

The present invention combines these separate programming principles.

BRIEF DESCRIPTION OF THE DRAWINGS

Two embodiments are described hereinafter relative to the drawings, wherein show.

DETAILED DESCRIPTION OF THE DRAWINGS

Figures 1, 2:
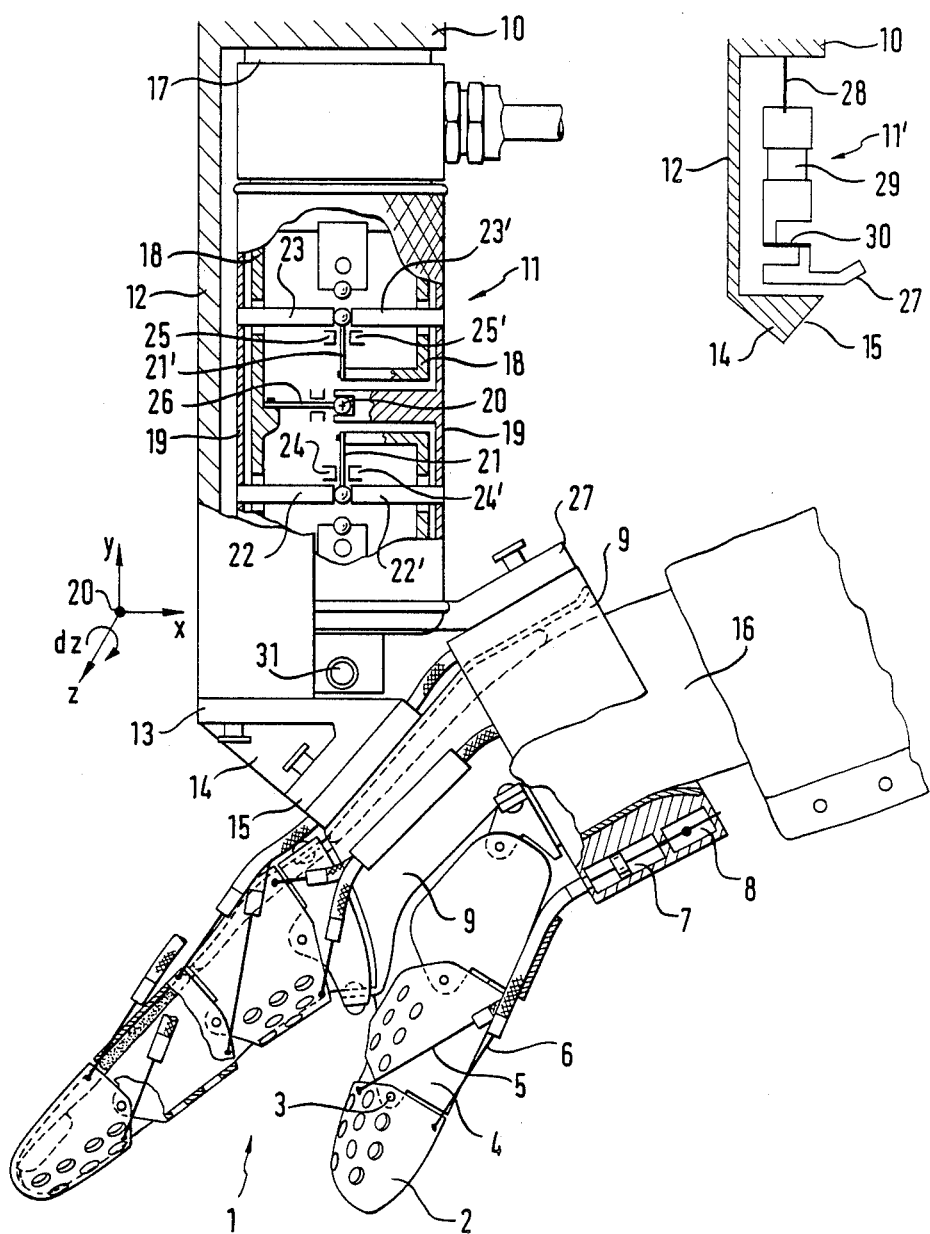
FIG. 1, a part sectionally represented gripping hand and the connection thereof to a manipulator are with a programming means according to a first embodiment.
FIG. 2, a diagrammatic representation of the connection using a programming means according to a second embodiment.

The construction and operation of gripping hand 1 is described and illustrated in detail in WO No. 83/02249. Therefore, hereinafter only the movement of a thumb tip member 2 is described. Member 2 is connected by means of a joint or articulation 3 to the finger intermediate member 4. A Bowden cable 5, 6 is fixed to member 2 on either side of joint 3. Each Bowden cable 5, 6 leads to a hydraulic positioning drive 7, which comprises a cylinder with piston, to which the Bowden cable is fixed. A sensor 8, which detects the movements of the particular Bowden cable, is associated with the positioning drive 7.

A hand is inserted in gripping hand 1 for programming purposes and to this end the members of hand 1 are hollow. On moving the thumb of the hand, the movements of, e.g., the finger tip member 2 are transferred to sensors 8 associated with the Bowden cable 5, 6 and the signals thereof are recorded. On operating the gripping hand, these signals control the positioning drives 7 associated with the Bowden cables 5, 6, so that e.g. the finger tip member 2 performs the movements previously performed by the hand and which are now programmed. All the positioning drives 7 and sensors 8 are arranged on a hand back member 9.

The end of an arm of a random manipulator is designated 10 and to said arm end 10 is connected a programming means 11, whose structure will be described hereinafter. The end of programming means 11 remote from arm end 10 has a coupling 27 by means of which said programming means end can be connected to the hand back member 9. Parallel to programming means 11 is provided a rigid connecting piece 12, which is fixed to arm end 10. At its end remote from arm end 10, it is connected via a coupling 13 to a coupling piece 14, which is in turn connected via a coupling 15 to the hand back member 9.

For programming purposes, coupling 15 is released and, preferably by detaching coupling 13, coupling piece 14 is removed, so that there is no connection between hand back member 9 and connecting piece 12. However, member 9 is connected via coupling 27 to programming means 11. If a human hand 16 is inserted in the gripping hand, then the movements thereof are transferred via coupling 27 to programming means 11. Thus, not only are the members of hand 1 programmable, as indicated hereinbefore, but also the manipulator, to whose arm end 10 is connected the gripping hand 1 is programmable. The programming of the manipulator takes place by means of programming means 11.

When programming is completed, the coupling piece 14 is inserted again and hand back member 9 is rigidly connected via couplings 13, 15 to connecting piece 12 and therefore to arm end 10. The signals produced by the sensors of programming means 11, following transformation, as recorded control signals control the positioning drives of the manipulator and therefore the movements of the arm end 10 fed in beforehand by hand 16. The control of the finger members of hand 1 takes place by means of positioning drive 7 as a function of the previously recorded signals of sensors 8, as produced during programming.

The connection between arm end 10 and programming means 11 is preferably detachable, in that a coupling 17 is provided. Coupling 27 is released at the end of the programming process and prior to the insertion of coupling piece 14 and the gripping hand is then removed. The programming means 11 can then be removed from arm end 10 by detaching coupling 17, so that it is available for programming further manipulators. As described hereinbefore, gripping hand 1 is then connected via couplings 13, 15 and coupling piece 14 to the connecting piece 12.

According to FIG. 1, use is made of a programming means 11, such as is described as the programming grip in Austrian Pat. No. 365 503. This programming means 11 has an inner part 18, which is rigidly connected to arm end 10. Inner part 18 is surrounded by a sleeve 19, which is rigidly connected to coupling 27. Leaf springs are provided between sleeve and inner part. Each spring is arranged on the inner part at one end and carries at the other end a ball, against which engage stops, which are rigidly connected to the sleeve. Two sensors are associated with each leaf spring. The coordinate centre of the programming means is designated 20. Programming in direction X will be explained hereinafter.

Two leaf springs 21, 21' are connected to inner part 18 and are arranged at right angles to the X-axis on either side of the coordinate centre 20. The balls of both leaf springs 21, 21' are surrounded on either side by stops 22, 22' and 23, 23', which are connected to sleeve 19. On either side of leaf spring 21 are provided sensors 24, 24' and on either side of leaf spring 21' are provided sensors 25, 25'. On performing a movement in the X-direction, springs 21, 21' are bent, so that the sensors 24, 25 produce equally large signals with respect to one another, which differ from the reciprocally equally large signals of sensors 24', 25'.

However, if hand 16 performs a rotary movement dz about axis z, then sensors 24, 25 produce equally large signals, which differ to the equally large signals of sensors 24', 25. In the case of the aforementioned movements x and dz, there is no influencing of leaf spring 26, which detects the movement in the y-direction. The further construction and operation of programming means 11 can be gathered from the aforementioned Austrian Pat. No. 365 503.

The programming means 11, according to FIG. 1, is of the type in which the sensors are arranged in comparable manner to an electric parallel connection between inner part 18 and sleeve 19, so that in each case one pair of sensors is associated with a movement direction and only this pair of sensors produces signals when a movement is performed with whose movement direction it is associated. The programming means 11', shown diagrammatically in FIG. 1 differs therefrom. It shows a first leaf spring 28 with associated sensors, which are on the one hand connected to the arm end and on the other to a connecting piece. In the extension of this connecting piece is provided a second leaf spring 29 with associated sensors, whose plane is at right angles to the plane of leaf spring 28. This leaf spring 29 is connected via a further connecting piece to a leaf spring 30 with associated sensors, whose plane is at right angles to the planes of leaf springs 28, 29. This leaf spring 30 is then connected to coupling 27. If movements of hand 16 are initiated via coupling 27 on programming means 11', then the sensors associated with leaf springs 28, 29, 30 produce signals, which are superimposed on one another for the movement directions. In the case of a movement about the z-axis for example the springs 28, 30 are bent, so that the corresponding sensors produce signals, which subsequently require decoupling.

On programming means 11 is provided a push-button switch 31, which serves as a dead switch and during programming is operated by one finger of the other hand of the programming person. If a wrong movement of the manipulator occurs during programming, then due to the release of the push-button switch 31, the complete drive of the manipulator is suddenly stopped.

I claim:

1. A gripping hand for a manipulator, said gripping hand comprising:

a plurality of hollow members simulating the human hand, including finger members and a hand back member said plurality of hollow members being interconnected in an articulated manner, a reversibly actuated positioning drive and a sensor being associated with each of said plurality of hollow members, said sensors detecting, for programming purposes, movements of said plurality of hollow members derived from a human hand inserted in said plurality of hollow members and signals generated by said sensors determining a program to be later performed by said plurality of hollow members, as controlled by a particular positioning drive, an arm, said plurality of hollow members being detachably connected on said arm and said arm being programmable by the movements of said hand back member, if a human hand performing movements is inserted in said plurality of hollow members and said arm is able to perform movements in three axes which are perpendicular to one another and also rotary movements, a programming means mounted on said arm, a rigid connecting piece connected to said arm, an end of said connecting piece remote from said arm having a first coupling, an end of said programming means remote from said arm being connected to said hand back member facing said arm and said hand back member being detachably connected via said first coupling to said rigid connecting piece, said programming means being detachably connected to said arm, and said rigid connecting piece including a coupling member detachably connected via a third coupling to said connecting piece and carrying said first coupling.

2. Gripping hand according to claim 1, wherein said end of said programming means remote from said arm includes a second coupling, with which said programming means is detachably connected to said hand back member.

3. Gripping hand according to claim 1, wherein said programming means for each movement direction of said arm has at least one sensor means.

4. Gripping hand according to claim 3, wherein said programming means includes an inner part rigidly connectable to said arm and a sleeve engaging surrounding said inner part, said sleeve being connectable to said hand back member, and said sensor means being arranged between said inner part and said sleeve.

5. Gripping hand according to claim 1, wherein a push-button switch is arranged on said programming means.

6. A gripping hand for a manipulator, said gripping hand comprising:
   a plurality of hollow members simulating the human hand, including finger members and a hand back member said plurality of hollow members being interconnected in an articulated manner,
   a reversibly actuated positioning drive and a sensor being associated with each of said plurality of hollow members, said sensors detecting, for programming purposes, movements of said plurality of hollow members derived from a human hand inserted in said plurality of hollow members and signals generated by said sensors determining a program to be later performed by said plurality of hollow members, as controlled by a particular positioning drive,
   an arm, said plurality of hollow members being detachably connected on said arm and said arm being programmable by the movements of said hand back member, if a human hand performing movements is inserted in said plurality of hollow members and said arm is able to perform movements in three axes which are perpendicular to one another and also rotary movements,
   a programming means mounted on said arm,
   a rigid connecting piece, an end of said rigid connecting piece remote from said arm having a first coupling,
   an end of said programming means remote from said arm being connected to said hand back member facing said arm and said hand back member being detachably connected via said fist coupling to said rigid connecting piece, said programming means for each movement direction of said arm having at least one sensor means, said programming means including an inner part rigidly connectable to said arm and a sleeve surrounding said inner part, said sleeve being connectable to said hand back member and said sensor means being arranged between said inner part and said sleeve.

7. Gripping hand according to claim 6, wherein said end of said programming means remote from said arm includes a second coupling, with which said programming means is detachably connected to said hand back member.

8. Gripping hand according to claim 6, wherein said programming means is detachably connected to said arm.

9. Gripping hand according to claim 8, wherein said connecting piece includes a coupling member detachably connected via a third coupling to said rigid connecting piece and carries said first coupling.

10. Gripping hand according to claim 1, wherein a push-button switch is arranged on said programming means.

11. A gripping hand on a manipulator adapted to be manipulated by a human operator to perform a task during a programming mode of operation, wherein different portions of said gripping hand and said manipulator are moved during said programming mode and signals representative of the movements are recorded for purposes of later driving said different portions to effect like movements during an operating mode of operation, said gripping hand of said manipulator comprising:
   a hollow central hand member,
   a plurality of hollow finger members interconnected sequentially to one another and to said central hand member by a plurality of pivotal joints forming hollow articulated finger units which receive fingers of a human operator and which is capable of movements about said joints through a range of movement corresponding to those of the human fingers during said programming mode,
   a plurality of finger member sensor elements for sensing movements of said finger members to generate signals representative of said movements during said programming mode,
   a plurality of finger member driving means responsive respectively to said signals for moving said finger members relative to one another and relative to said central hand member during said operating mode,
   a rigid connecting piece on an arm of said manipulator,
   a coupling member which is detachably connected via a first coupling to said connecting piece and via a third coupling to said hand, and
   programming means on said arm parallel to said connecting piece for programming movements of said arm in three perpendicular axes and around said axes during said programming mode, the end of said programming means remote from said arm being connected to said central hand member.

12. A gripping hand as defined in claim 11, wherein said programming means is detachably connected to said arm and to said central hand member.

13. A gripping hand as defined in claim 11, wherein said programming means includes an inner part rigidly connected to said arm, a sleeve surrounding said inner part and sensor means arranged between said inner part and said sleeve for sensing movements of said sleeve relative to said inner part in said perpendicular axes and around said axes during said programming mode, said sleeve being connected to said central hand member.

* * * * *